(12) United States Patent
Kim et al.

(10) Patent No.: US 10,024,389 B2
(45) Date of Patent: Jul. 17, 2018

(54) POWER TRANSMISSION BELT

(71) Applicant: BANDO CHEMICAL INDUSTRIES, LTD., Kobe-shi (JP)

(72) Inventors: Sungjin Kim, Kobe (JP); Sakae Umeda, Kobe (JP); Yuji Nakamoto, Kobe (JP); Keiichiro Shimono, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 0 days.

(21) Appl. No.: 15/349,804

(22) Filed: Nov. 11, 2016

(65) Prior Publication Data

US 2017/0058996 A1 Mar. 2, 2017

Related U.S. Application Data

(63) Continuation of application No. PCT/JP2015/001489, filed on Mar. 17, 2015.

(30) Foreign Application Priority Data

May 22, 2014 (JP) ................................. 2014-105893

(51) Int. Cl.
| | |
|---|---|
| *F16G 1/04* | (2006.01) |
| *F16G 5/20* | (2006.01) |
| *B29D 29/08* | (2006.01) |
| *B29D 29/10* | (2006.01) |
| *F16G 5/08* | (2006.01) |
| *B29K 23/00* | (2006.01) |
| *B29K 105/00* | (2006.01) |
| *B29K 105/08* | (2006.01) |

(Continued)

(52) U.S. Cl.
CPC ............... *F16G 5/20* (2013.01); *B29D 29/08* (2013.01); *B29D 29/103* (2013.01); *F16G 5/08* (2013.01); *B29K 2023/16* (2013.01); *B29K 2105/0044* (2013.01); *B29K 2105/0836* (2013.01); *B29K 2105/12* (2013.01); *B29K 2105/16* (2013.01); *B29K 2105/24* (2013.01); *B29K 2267/003* (2013.01); *B29K 2277/00* (2013.01); *B29K 2313/00* (2013.01); *B29K 2507/04* (2013.01); *B29K 2509/02* (2013.01)

(58) Field of Classification Search
CPC ..... F16G 5/20; F16G 1/28; F16G 5/08; B29D 29/00; B29D 29/08
USPC .................................................. 474/266, 238
See application file for complete search history.

(56) References Cited

U.S. PATENT DOCUMENTS

| | | | | |
|---|---|---|---|---|
| 2,153,966 A | * | 4/1939 | Lejeune | ............... D03D 1/0094 |
| | | | | 156/137 |
| 2,386,761 A | * | 10/1945 | Wetherbee | ............. B29D 29/00 |
| | | | | 156/140 |

(Continued)

FOREIGN PATENT DOCUMENTS

| | | |
|---|---|---|
| CN | 101558251 A | 10/2009 |
| JP | H08-232137 A | 9/1996 |

(Continued)

*Primary Examiner* — Henry Y Liu
(74) *Attorney, Agent, or Firm* — Knobbe, Martens, Olson & Bear, LLP

(57) ABSTRACT

A frictional transmission belt according to the present disclosure has a belt body wound around a pulley to transmit power. The belt includes a water absorptive fabric covering at least one side of the belt body that contacts with the pulley.

8 Claims, 7 Drawing Sheets

(51) Int. Cl.
  *B29K 105/12*  (2006.01)
  *B29K 105/16*  (2006.01)
  *B29K 105/24*  (2006.01)
  *B29K 267/00*  (2006.01)
  *B29K 277/00*  (2006.01)
  *B29K 507/04*  (2006.01)
  *B29K 509/02*  (2006.01)

(56) References Cited

U.S. PATENT DOCUMENTS

| | | | | |
|---|---|---|---|---|
| 4,583,302 A | * | 4/1986 | Smith | D21F 1/0072 139/383 A |
| 5,382,200 A | * | 1/1995 | Kimoto | F16G 1/28 474/260 |
| 5,545,097 A | * | 8/1996 | Kitazumi | F16G 1/28 474/266 |
| 5,611,745 A | * | 3/1997 | Uto | F16G 1/28 474/205 |
| 5,853,849 A | * | 12/1998 | Nishio | B32B 25/10 198/846 |
| 5,984,816 A | * | 11/1999 | Nishio | F16H 7/023 474/153 |
| 6,116,156 A | * | 9/2000 | Schiel | B65G 15/32 100/118 |
| 6,465,074 B1 | * | 10/2002 | FitzPatrick | D03D 1/0094 162/358.4 |
| 8,235,852 B2 | * | 8/2012 | Hineno | F16G 5/20 474/263 |
| 8,357,065 B2 | * | 1/2013 | Duke, Jr. | B29D 29/08 474/205 |
| 8,845,468 B2 | * | 9/2014 | Takahashi | C08K 3/04 474/148 |
| 2008/0004145 A1 | * | 1/2008 | Duke | B29D 29/08 474/205 |
| 2008/0135199 A1 | * | 6/2008 | Rouhling | B31F 1/2877 162/296 |
| 2008/0261739 A1 | * | 10/2008 | Kanzow | D04B 21/18 474/266 |
| 2009/0298633 A1 | * | 12/2009 | Hineno | F16G 5/06 474/263 |
| 2010/0167860 A1 | | 7/2010 | Mori et al. | |
| 2010/0173740 A1 | | 7/2010 | Mori et al. | |
| 2011/0086735 A1 | * | 4/2011 | Takahashi | C08K 3/04 474/148 |
| 2011/0269589 A1 | * | 11/2011 | Schleicher | F16G 1/28 474/205 |
| 2011/0300981 A1 | * | 12/2011 | Takahashi | C08K 3/346 474/264 |
| 2014/0135161 A1 | | 5/2014 | Mori et al. | |
| 2014/0296010 A1 | * | 10/2014 | Yoshida | B29D 29/103 474/190 |
| 2015/0285335 A1 | * | 10/2015 | Mitsutomi | F16G 5/20 474/238 |
| 2015/0369335 A1 | * | 12/2015 | Ishiguro | C08K 7/02 474/260 |
| 2016/0053851 A1 | * | 2/2016 | Kojima | F16G 5/20 474/265 |
| 2017/0009847 A1 | * | 1/2017 | Mitsutomi | D04B 21/20 |
| 2017/0058995 A1 | * | 3/2017 | Kim | F16G 1/00 |
| 2017/0058996 A1 | * | 3/2017 | Kim | B29D 29/08 |
| 2017/0284504 A1 | * | 10/2017 | Mitsutomi | F16G 5/08 |

FOREIGN PATENT DOCUMENTS

| | | |
|---|---|---|
| JP | H10-8375 A | 1/1998 |
| JP | 2004-176904 A | 6/2004 |
| JP | 2013-213576 A | 10/2013 |
| WO | 2013/061512 A1 | 5/2013 |
| WO | WO-2014157593 A1 * | 10/2014 ............... F16G 5/20 |

* cited by examiner

POWER TRANSMISSION BELT

CROSS-REFERENCE TO RELATED APPLICATION

This is a continuation of International Application No. PCT/JP2015/001489 filed on Mar. 17, 2015, which claims priority to Japanese Patent Application No. 2014-105893 filed on May 22, 2014. The entire disclosures of these applications are hereby incorporated by reference.

BACKGROUND

The present disclosure relates to a power transmission belt.

As a means for transmitting the rotative power generated by an engine, a motor or any other drive sources for use in various types of machines, automobiles and other structures, a power transmission belt such as a frictional transmission belt is generally used. If such a transmission belt becomes wet with water pouring, then belt slipping and other unwanted phenomena will arise to a more significant degree, so-called "stick-slip" abnormal noise will be generated, and its power transmission performance will decline to cause deterioration in its fuel consumption.

To overcome such a problem, Japanese Unexamined Patent Publication No. 2004-176904 discloses a V-ribbed belt, of which a portion that contacts with a pulley is made of a rubber composition including porous acrylic short fibers. According to this document, the contact portion made of such a material allows the water poured to be absorbed and drained effectively enough to reduce the slipping.

The frictional transmission belt disclosed in Japanese Unexamined Patent Publication No. 2004-176904 is effective to a certain degree in reducing the generation of abnormal noise and a decline in power transmission performance at the time of water pouring. However, further improvements need to be achieved in order to meet growing demands for high-performance transmission belts. In view of the foregoing background, it is therefore an object of the present disclosure to provide a frictional transmission belt which may operate with reduced abnormal noise even in a more stressful environment (e.g., when the belt needs to be driven with a non-negligible degree of misalignment, or is supplied with a lot of water, or causes a significant variation with rotation).

SUMMARY

To achieve this object, the present disclosure provides a frictional transmission belt having a belt body wound around a pulley to transmit power. The belt includes a water absorptive fabric covering at least one side of the belt body that contacts with the pulley.

In one embodiment, the water absorptive fabric may be either a woven fabric or a knit fabric, and the water absorptive fabric may be partially embedded in a rubber composition that makes up the belt body.

In a specific embodiment, the yarn forming the water absorptive fabric may include a spun yarn of polyethylene terephthalate, polyamide, or aramid.

In another embodiment, the yarn forming the water absorptive fabric may include a modified cross-section yarn.

In still another embodiment, the yarn forming the water absorptive fabric may include a microfiber.

In yet another embodiment, the yarn forming the water absorptive fabric may include a hollow fiber.

Optionally, a frictional transmission belt according to the present disclosure may be produced by: winding a fabric around a surface of a rubber layer to form the belt body, thereby forming a molded part; pressing the molded part onto a belt-molding die having ribbed recesses that define the side to contact with the pulley; and allowing the molded body to crosslink.

A frictional transmission belt according to the present disclosure allows the water poured to be repeatedly absorbed and repelled quickly using a water absorptive fabric provided over one side of the belt that contacts with a pulley, which thus reduces the generation of abnormal noise during the water pouring.

DETAILED DESCRIPTION

Embodiments will now be described in detail with reference to the accompanying drawings.

(V-Ribbed Belt)

Figure 1:
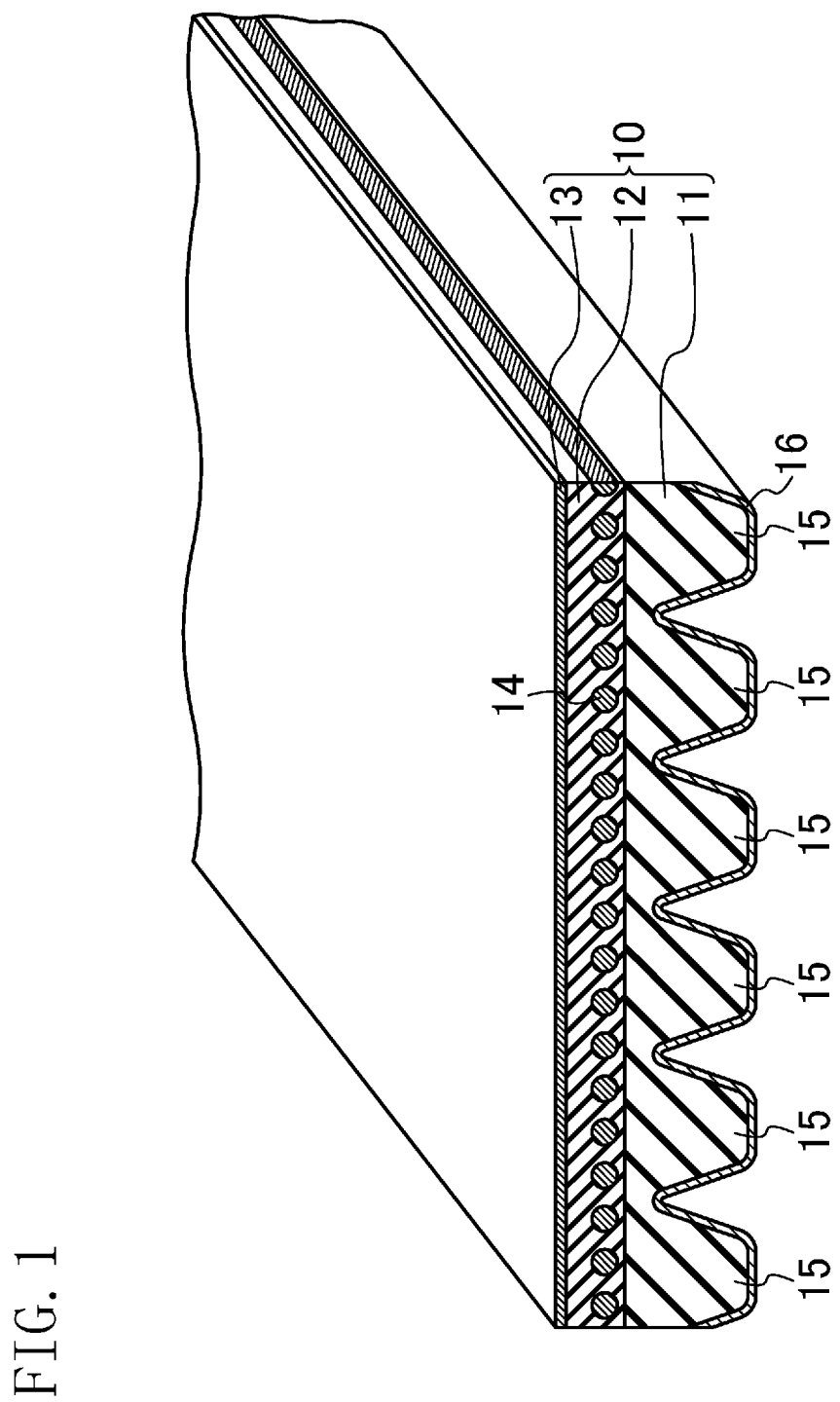
FIG. 1 is a perspective view schematically illustrating a V-ribbed belt according to an embodiment of the present disclosure.

FIG. 1 illustrates an exemplary V-ribbed belt B (friction transmission belt) according to an embodiment of the present invention. This V-ribbed belt B may be used to form part of an accessory driving belt transmission system provided in an engine compartment of an automobile, for example. The V-ribbed belt B may have a belt circumferential length of 700-3000 mm, a belt width of 10-36 mm, and a belt thickness of 4.0-5.0 mm.

The V-ribbed belt B includes a belt body 10 with a triple-layer structure comprised of a compression rubber layer 11 on the inner periphery of the belt, an intermediate adhesive rubber layer 12, and a backside rubber layer 13 on the outer periphery of the belt. A cord 14 is embedded in the adhesive rubber layer 12 so as to form a helical pattern having a predetermined pitch in the belt width direction.

The compression rubber layer 11 has a plurality of V-ribs 15 provided on the inner periphery of the belt so as to extend vertically downward and to form portions to come into contact with the pulleys. Each of these V-ribs 15 is formed to run in the belt length direction and to have a protruding shape with a substantially inverted triangular cross section. Also, these V-ribs 15 are arranged side by side in the belt width direction. Each of these V-ribs 15 may have a rib height of 2.0-3.0 mm and an inter-base width of 1.0-3.6 mm. The number of ribs provided there may be three to six (e.g., six in the example illustrated in FIG. 1), for example.

In addition, a fabric layer 16 is also provided over the surface of the V-ribs 15 of the V-ribbed belt body 10 (i.e., over the surface to come into contact with the pulleys).

In this embodiment, the fabric layer 16 is implemented as a water absorptive fabric. The yarn forming the water absorptive fabric may be a spun yarn of polyethylene terephthalate (PET), polyamide, or a meta-type aramid (such as Cornex™ produced by Teijin Ltd.). Alternatively, the yarn forming the water absorptive fabric may also be a modified cross-section yarn of polyethylene terephthalate or polyamide, a microfiber (ultrafine fiber), or a hollow fiber. Each of these yarns includes fibers with so small a diameter that the capillarity and the surface area of the fibers increase significantly, thus increasing the water absorptivity.

As used herein, the "modified cross-section yarn" refers to a yarn with a triangular, hexagonal, indefinite cross section or a cross section in any of various shapes other than a normal circular cross section. Such a modified cross-section yarn may be formed if a nozzle with a non-circular port is used during spinning, and may have a larger surface area than a yarn with a normal circular cross section. The microfiber may have a fineness of 30-120 dtex, for example.

The water absorptive fabric may be a knit fabric or a woven fabric. Optionally, the water absorptive fabric may be partially embedded in a rubber composition that makes up the belt body 10.

As can be seen, if one side of the belt body 10 that contacts with the pulley is covered with such a fabric layer 16 of a water absorptive fabric, the generation of abnormal noise may be either reduced significantly or even eliminated during water pouring. This is achieved because even if water is poured onto the belt, the water absorptivity of the fabric layer 16 allows the water to be quickly absorbed or repelled repeatedly, thus minimizing the belt's slipping.

Note that the compression rubber layer 11 is made of a rubber composition obtained by crosslinking an uncrosslinked rubber composition, which has been kneaded with various ingredients added to a rubber component, under heat and pressure.

The rubber component of the rubber composition that makes the compression rubber layer 11 includes an ethylene-α-olefin elastomer. Examples of the ethylene-α-olefin elastomers include ethylene-propylene-diene terpolymer (EPDM), ethylene-propylene copolymer (EPM), ethylene-butene copolymer (EBM), and ethylene-octene copolymer (EOM). The ethylene-α-olefin elastomer included in the rubber component may be comprised of either a single species or a mixture of a plurality of species. The ethylene-α-olefin elastomer may have an ethylene content of 50-80 mass %, for example.

The content of the ethylene-α-olefin elastomer in the rubber component may be 60 mass % or more in an exemplary embodiment, 80 mass % or more in an advantageous embodiment, and 100% in a specific advantageous embodiment. That is to say, in the specific advantageous embodiment, the rubber component may consist essentially of the ethylene-α-olefin elastomer. Examples of other rubber materials which may be included in the rubber component include chloroprene (CR) rubber, chlorosulfonated polyethylene (CSM) rubber and hydrogenated acrylonitrile-butadiene (H-NBR) rubber.

Examples of ingredients which may be added to the rubber composition that makes the compression rubber layer 11 include a reinforcing material such as carbon black, a vulcanization accelerator, a crosslinker, an antioxidant, and a softener.

Among other things, carbon black may be used as the reinforcing material in an exemplary embodiment. Examples of those carbon blacks include: channel black; furnace blacks such as SAF, ISAF, N-339, HAF, N-351, MAF, FEF, SRF, GPF, ECF, and N-234; thermal blacks such as FT and MT; and acetylene blacks. Silica may also be used as the reinforcing material. The reinforcing material may be made of either a single species or a plurality of species. To strike an adequate balance in abrasion resistance and flex resistance, the content of the reinforcing material added relative to 100 parts by mass of the rubber component may typically be 30-80 parts by mass.

Examples of the vulcanization accelerators include metallic oxides such as magnesium oxide and zinc oxide (zinc flower), metal carbonates, fatty acids such as stearic acid, and derivatives thereof. The vulcanization accelerator may be made of either a single species or a plurality of species. The content of the vulcanization accelerator added relative to 100 parts by mass of the rubber component may be 0.5 to 8 parts by mass, for example.

Examples of the crosslinkers include sulfur and organic peroxides. Sulfur, an organic peroxide, or a combination of sulfur and an organic peroxide may be used as the crosslinker. In the case of sulfur, the content of the crosslinker added may be 0.5 to 4.0 parts by mass relative to 100 parts by mass of the rubber component. On the other hand, in the case of an organic peroxide, the content of the crosslinker added may be 0.5 to 8 parts by mass relative to 100 parts by mass of the rubber component.

Examples of the antioxidants include amines, quinolines, hydroquinone derivatives, phenols, and phosphites. The antioxidant may be made of either a single species or a plurality of species. The content of the antioxidant relative to 100 parts by mass of the rubber component may be 0 to 8 parts by mass, for example.

Examples of the softeners include petroleum softeners, mineral oil-based softeners such as paraffin wax, and vegetable oil based-softeners such as castor oil, cottonseed oil, linseed oil, rapeseed oil, soybean oil, palm oil, coconut oil, peanut oil, Japan wax, rosin, and pine oil. The softener may be made of either a single species or a plurality of species. In every softener but the petroleum softener, the content of the softener added relative to 100 parts by mass of the rubber component may be 2 to 30 parts by mass, for example.

(Method of Making V-Ribbed Belt)

Figure 2:
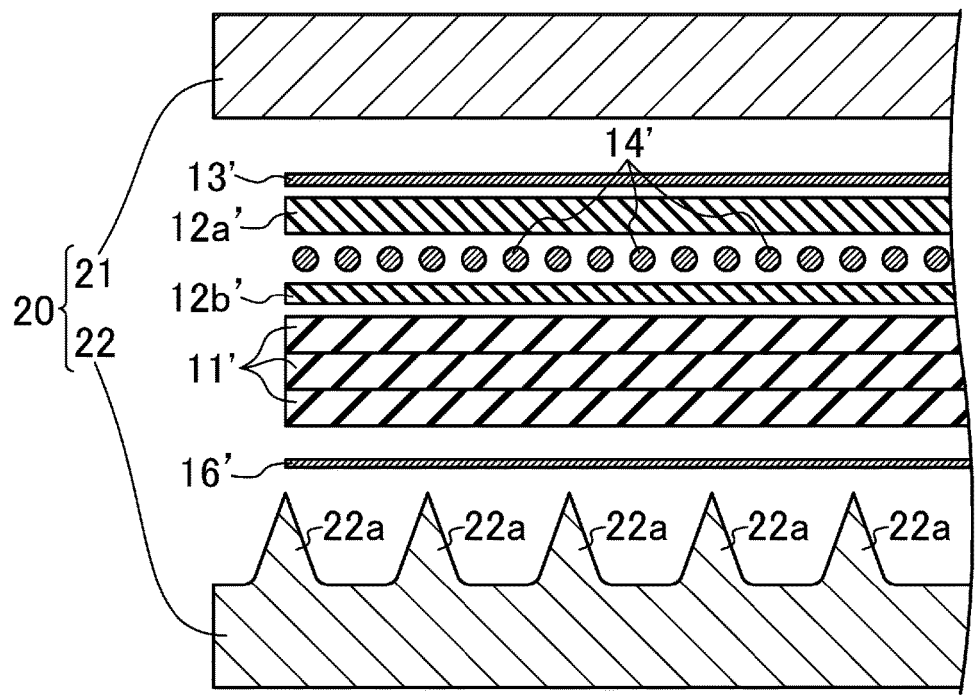
FIG. 2 illustrates a manufacturing process step of the V-ribbed belt shown in FIG. 1.
Figure 3:
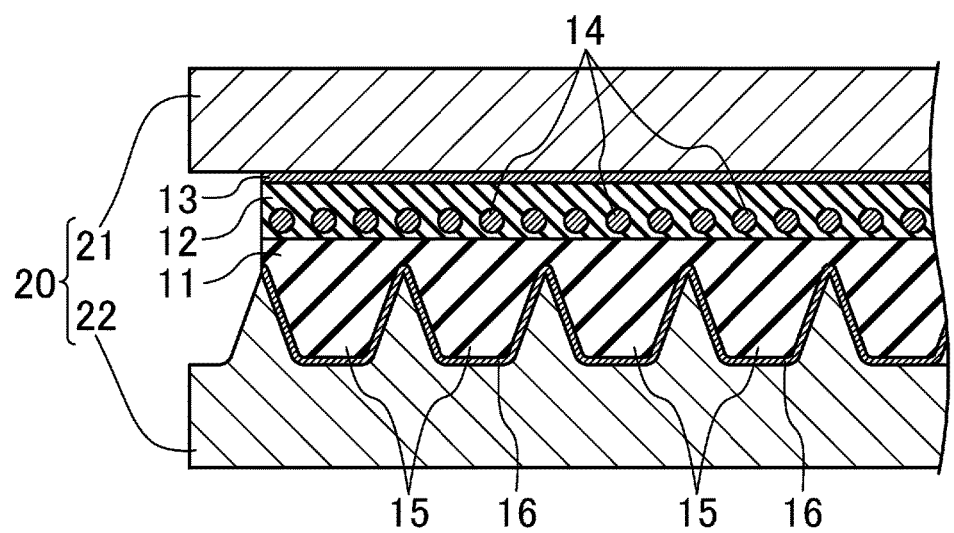
FIG. 3 illustrates another manufacturing process step of the V-ribbed belt shown in FIG. 1 to be performed after the one shown in FIG. 2.

Next, it will be described with reference to FIGS. 2 and 3 how to make the V-ribbed belt B. In this embodiment, a belt forming apparatus 20 is used for that purpose. The belt forming apparatus 20 includes a rubber sleeve mold 21 in a cylindrical shape, and a cylindrical outer mold 22 fitting to the rubber sleeve mold 21.

The rubber sleeve mold 21 may be a flexible one made of, for example, acrylic rubber. If high-temperature water vapor is blown from inside the cylindrical rubber sleeve mold 21, for example, the rubber sleeve mold 21 may be inflated radially outward and pressed against the cylindrical outer mold 22. The outer peripheral surface of the rubber sleeve mold 21 is shaped so that one side of the V-ribbed belt B to be a rear surface thereof is formed to have a smooth surface, for example. The rubber sleeve mold 21 may have an outside diameter of 700 mm to 2,800 mm, a thickness of 8 mm to 20 mm, and a height of 500 mm to 1,000 mm, for example.

The cylindrical outer mold 22 may be made of a metallic material, for example. The inner surface of the cylindrical outer mold 22 is provided with projections 22a extending in the circumferential direction and arranged in the height direction. The projections 22a have a substantially inverted triangular cross section to form the V-ribs 15 of the V-ribbed belt B. There may be 140 projections 22a arranged in the height direction, for example. The cylindrical outer mold 22 may have, for example, an outside diameter of 830 mm to 2,930 mm, an inside diameter (not including the projections 22a) of 730 mm to 2,830 mm, and a height of 500 mm to 1,000 mm. Each of the projections 22a may have a height of 2.0 mm to 2.5 mm, and a width of 3.5 mm to 3.6 mm.

The respective materials of the belt are sequentially introduced into this belt forming apparatus 20. First, a cylindrical rubber sheet 13' to be the rear rubber layer 13 is fitted to the rubber sleeve mold 21. After that, ashent of adhesive rubber material 12a' is wrapped over the cylindrical rubber sheet 13'. Next, a twisted yarn 14' is also wound several times over the adhesive rubber material 12a' to extend in the circumferential direction. In this case, the twisted yarn 14' is wound to form a helical pattern having a pitch in the height direction of the rubber sleeve mold 21. Next, another sheet of adhesive rubber material 12b' is wrapped over the twisted yarn 14', and then another sheet of compressed rubber material 11' of a rubber composition including a water absorbing agent 17 is wrapped over the adhesive rubber material 12b'. Thereafter, a cylindrical fabric 16' is fitted onto the compressed rubber material 11'. As a result, as illustrated in FIG. 3, the rubber sheet 13', the adhesive rubber material 12a', the twisted yarn 14', the adhesive rubber material 12b', the compressed rubber material 11', and the fabric 16' are stacked one upon the other in this order on the rubber sleeve mold 21. Then, the cylindrical outer mold 22 is attached to the outermost one of these belt materials.

Subsequently, with the cylindrical outer mold 22 attached to the rubber sleeve mold 21, high-temperature water vapor may be blown into the rubber sleeve mold 21, for example, to apply heat and pressure to the rubber sleeve mold 21. Thus, the rubber sleeve mold 21 is inflated and pressed against the cylindrical outer mold 22 such that the belt materials are sandwiched between the rubber sleeve mold 21 and the cylindrical outer mold 22. At this time, the belt materials have a temperature of 150° C. to 180° C., for example, and are under a pressure of 0.5 MPa to 1.0 MPa applied radially outward. Thus, as the rubber ingredient flows, a crosslinking reaction progresses, so does the adhesive reaction of the rubber ingredient to the fabric 16' and the twisted yarn 14'. Furthermore, the projections 22a, provided on the inner surface of the cylindrical outer mold 22 in order to form V-ribs 15, define V-grooves between the V-ribs 15. In this manner, a V-ribbed belt slab (i.e. a belt body precursor) is formed.

Finally, the V-ribbed belt slab is cooled and then removed from the belt forming apparatus 20. After that, the removed V-ribbed belt slab is sliced into a plurality of rings each having a width of, for example, 10.68 mm to 28.48 mm. Then, each of these sliced rings is turned over. In this manner, V-ribbed belts B are obtained.

Note that, in this embodiment, a sheet of adhesive rubber material 12' and a sheet of compressed rubber material 11' are introduced to be wrapped over the rubber sleeve mold 21. In an alternative embodiment, however, these rubber materials 12' and 11' may be formed in a cylindrical shape in advance, and then such cylinders of rubber materials may be fitted onto the rubber sleeve mold 21.

In the belt forming apparatus 20 described above, the inner surface of the cylindrical outer mold 22 is supposed to be provided with V-grooves to form V-ribs 15 of the V-ribbed belt B. However, this is only a non-limiting exemplary embodiment. Alternatively, the outer peripheral surface of the rubber sleeve mold may have projections to form the V-ribs 15 of the V-ribbed belt B, and the inner surface of the cylindrical outer mold 22 may have a smooth surface to form the rear surface of the V-ribbed belt B. In this case, the fabric 16', the compressed rubber material 11', the adhesive rubber material 12', the twisted yarn 14', the adhesive rubber material 12', and the rubber sheet 13' are wound around the rubber sleeve mold 21 in this order.

Although the present disclosure has been described as being implemented as a V-ribbed belt and method of manufacturing such a belt, this is only an exemplary embodiment of the present disclosure. Alternatively, the present disclosure may also be implemented as a flat belt, a V-belt or any other appropriate type of belt as well.

EXAMPLES (Rubber Composition)

The following rubber compositions were prepared to form a belt. Their respective makeups are also shown in Table 1.

As a rubber composition, an uncrosslinked rubber composition was prepared by mixing 100 parts by mass of EPDM (made by Mitsui Chemical, Inc., trade name: EPT3045) as a rubber component with 60 parts by mass of HAF carbon black (made by Tokai Carbon Co., Ltd., trade name: SEAST SO), 30 parts by mass of montmorillonite (made by HOJUN, trade name: Bengel A, swelling power: 46 ml/2 g, cation exchange capacity: 94 meg/100 g), 5 parts by mass of zinc oxide (made by Sakai Chemical Industry Co., Ltd., trade name: Zinc Flower Class 2), 2 parts by mass of an antioxidant (made by Ouchi Shinko Chemical Industrial Co., Ltd., trade name: NOCRAC MB), 10 parts by mass of paraffinic oil (made by Idemitsu Kosan Co., Ltd., trade name: Diana Process Oil PS-90), 2.3 parts by mass of sulfur (made by Hosoi Chemical Industry, Co., Ltd., trade name: OIL SULFUR), 1.4 parts by mass of a vulcanization accelerator (made by SANSHIN CHEMICAL INDUSTRY CO., LTD., trade name: TET, EZ, MSA), and 30 parts by mass of short fibers (made by Asahi Kasei Corporation, trade name: Leona 66, fiber length: 1 mm), and kneading the mixture in an internal kneader for about 5 minutes.

TABLE 1

| | | |
|---|---|---|
| EPDM | made by Mitsui Chemical, Inc., trade name: EPT3045 | 100 |
| HAF carbon black | made by Tokai Carbon Co., Ltd., trade name: SEAST SO | 60 |
| Zinc oxide | made by Sakai Chemical Industry Co., Ltd., trade name: Zinc Flower Class 2 | 5 |
| Antioxidant | made by Ouchi Shinko Chemical Industrial Co., Ltd., trade name: NOCRAC MB | 2 |
| Paraffinic oil | made by Idemitsu Kosan Co., Ltd., trade name: Diana Process Oil PS-90 | 10 |
| Sulfur | made by Hosoi Chemical Industry, Co., Ltd., trade name: OIL SULFUR | 2.3 |

TABLE 1-continued

| | | |
|---|---|---|
| Vulcanization accelerator | made by SANSHIN CHEMICAL INDUSTRY CO., LTD., trade name: TET, EZ, MSA | 1.4 |
| Short Fibers of nylon | made by Asahi Kasei Corporation, trade name: Leona 66, fiber length: 1 mm | 30 |

(Fabric Layer)

As the fabric layer 16 to coat the surface of the V-ribs 15, the following Knit Fabrics 1-7 were provided as also shown in Table 2. Each of those knit fabrics was obtained by knitting a covering yarn which used a urethane fiber (e.g., a polyurethane elastic fiber, 33 dtex) as a core yarn and another type of fiber as a covering fiber.

The knit fabrics were joined together by ultrasonic welding.

(Knit Fabric 1)

Knit Fabric 1 is obtained by knitting a #30 polyethylene terephthalate (PET) spun yarn as a covering yarn.

(Knit Fabric 2)

Knit Fabric 2 is obtained by knitting a polyethylene terephthalate hollow yarn (made by Teijin Limited, trade name: AEROCAPSULE) as a covering yarn. The hollow yarn has a fiber fineness of 110 dtex at a fiber number of 24.

(Knit Fabric 3)

Knit Fabric 3 is obtained by knitting a polyethylene terephthalate modified cross-section yarn (made by Teijin Limited, trade name: CALCULO) as a covering yarn. The modified cross-section yarn has a fiber fineness of 84 dtex at a fiber number of 24. In this case, the yarn has an indefinite cross section (Knit Fabric 4)

Knit Fabric 4 is obtained by knitting an aramid spun yarn as a covering yarn. The yarn count of the aramid spun yarn is #40.

(Knit Fabric 5)

Knit Fabric 5 is obtained by knitting a water absorptive acrylate fiber as a covering yarn. More specifically, the covering yarn is comprised of 30% of acrylate fiber and 70% of polyethylene terephthalate fiber.

(Knit Fabric 6)

Knit Fabric 6 is obtained by knitting a microfiber as a covering yarn. The microfiber has a splittable conjugate fiber of polyethylene terephthalate and polyamide and has a fineness of 84 dtex at a fiber number of 20. In each fiber, the PET portion is separated into 17 parts.

(Knit Fabric 7)

Knit Fabric 7 is obtained by knitting a microfiber as a covering yarn. The microfiber is a polyethylene terephthalate fiber with a fiber fineness of 84 dtex at a fiber number of 144.

TABLE 2

| | Type | Yarn makeup |
|---|---|---|
| Knit Fabric 1 | PET spun yarn | #30 PET spun yarn, urethane 33 dtex |
| Knit Fabric 2 | AEROCAPSULE (PET hollow yarn) | AEROCAPSULE (PET hollow yarn) 110 dtex (24f), urethane 33 dtex |
| Knit Fabric 3 | modified cross-section yarn (PET) | CALCULO (PET, modified cross-section) 84 dtex (24f), urethane 33 dtex |
| Knit Fabric 4 | CORNEX | CORNEX (spun yarn) #40, urethane 33 dtex |
| Knit Fabric 5 | Acrylate fiber (water absorptive yarn) | Acrylate fiber 30%, PET 70%, urethane 33 dtex |
| Knit Fabric 6 | Microfiber | PET, nylon splittable conjugate fiber 84 dtex (20f: separated into 17 parts after splitting), urethane 33 dtex |
| Knit Fabric 7 | Microfiber | PET microfiber 84 dtex (144f), urethane 33 dtex |

Note that each knit fabric is subjected to RFL treatment by a general technique. The water absorptiveness of the fiber would somewhat decrease, but would not be lost completely, as a result of the RFL treatment. Rather, a sufficient degree of water absorptiveness may be maintained irrespective of the type of the yarn, which may be a modified cross-section yarn, a hollow yarn, a microfiber, or any other type of yarn.

(V-Ribbed Belt)

A compression rubber layer 11 was formed out of the rubber composition described above, and any of these Knit Fabrics 1-7 was used as a fabric 16' to make the fabric layer 16, thereby producing V-ribbed belts as Examples 1-7. Meanwhile, as a comparative example, a V-ribbed belt without the fabric layer 16 was also produced by forming V ribs by grinding.

The adhesive rubber layer and rear rubber layer were formed out of the rubber composition of EPDM and their cord was formed as a twisted yarn of polyethylene terephthalate (PET) fiber. The belt thus obtained had a belt circumferential length of 1200 mm, a belt width of 21.36 mm, a belt thickness of 4.3 mm, and the number of ribs of six.

(Test/Evaluation Method)

Figure 4:
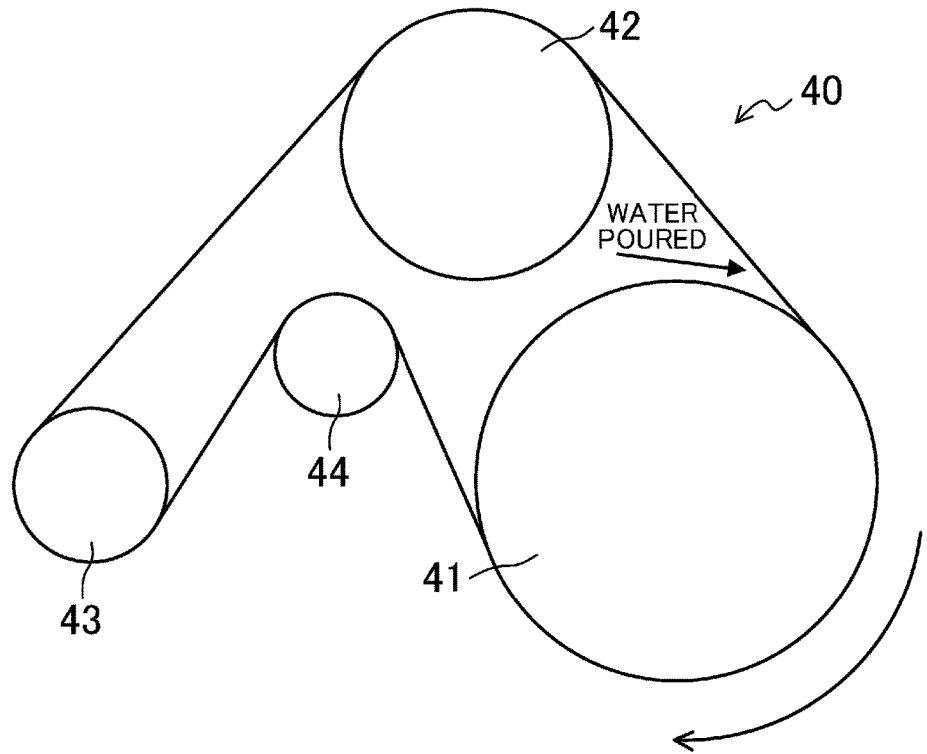
FIG. 4 illustrates an exemplary layout of pulleys in a belt-running tester for use in a water pouring abnormal noise test.

FIG. 4 illustrates a layout of pulleys in a belt running test machine 40 for a water-pouring noise test.

This belt running test machine 40 for a water-pouring noise test includes a drive pulley 41, first and second driven pulleys 42, 43, and an auto-tensioner 44. Specifically, the drive pulley 41 serves as a crank pulley and has a pulley diameter of 150 mm. The first driven pulley 42 is arranged on an upper left side of the drive pulley 41, serves as a water pump pulley, and has a pulley diameter of 110 mm. The second driven pulley 43 is arranged on a lower left side of the first driven pulley 42, serves as an alternator pulley, and has a pulley diameter of 60 mm. The auto-tensioner 44 is arranged between the drive pulley 41 and the second driven pulley 43 and has a pulley diameter of 120 mm.

This belt running test machine 40 for a water-pouring noise test is wound with a V-ribbed belt such that its V-ribbed side is in contact with the drive pulley 41 and first and second driven pulleys 42, 43, all three of which are ribbed pulleys, and its rear side is in contact with the auto-tensioner 44 that is a flat pulley.

The noise test was carried out with the drive pulley 41 rotated at a rotational velocity of 780 revolutions per minute (rpm) and with water poured (e.g., sprayed ten times) onto an entry point of the drive pulley 41. The alternator had a capacity of 180 A. The atmosphere had a temperature of 20° C. The belt had a tension of 400 N.

Test results thus obtained in the first through seventh examples described above are shown in FIGS. 5-11, respectively. A test result obtained in the comparative example is shown in FIG. 12. In FIGS. 5-12, the abscissa indicates a peak-to-peak value (%) of a rotational variation rate transmitted by the drive pulley 41 (functioning as an engine crank pulley), and the ordinate indicates a load applied to the alternator. Each of these graphs indicates a threshold value at which abnormal noise starts to be generated. That is to say, in each of these graphs, an abnormal noise generation pattern is mapped with the rotational variation rate of the engine and load applied to the alternator varied. Specifically, noise was generated in the range over the polygon, but no noise was generated in the range under the polygon.

Specifically, in the comparative example shown in FIG. 12 (a ground product with no knit fabric), if the p-p value was 10%, abnormal noise was generated when the current value exceeded about 60 A. On the other hand, if the p-p value was in the range of 10-20%, the current value at which abnormal noise was generated decreased as the p-p value increased. If the p-p value was 20% (and fell within the range of 20-30%), abnormal noise was generated when the current value exceeded approximately 30 A.

In contrast, in each of the first through seventh examples shown in FIGS. 5-11, the threshold value of abnormal noise generation was higher, and abnormal noise was generated less easily, than in the comparative example shown in FIG. 12.

Figure 8:
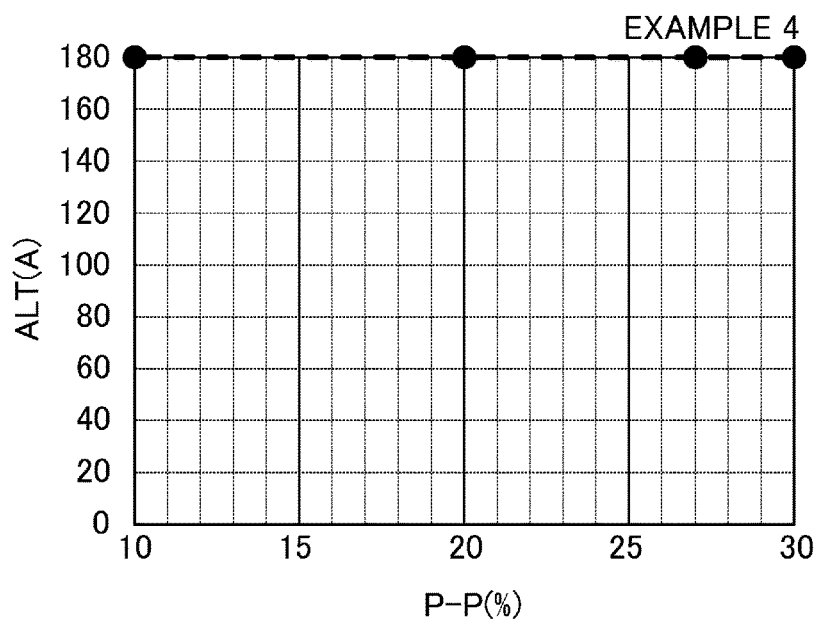
FIG. 8 shows results of an abnormal noise test carried out on a belt as a fourth specific example of the present disclosure.
Figure 9:
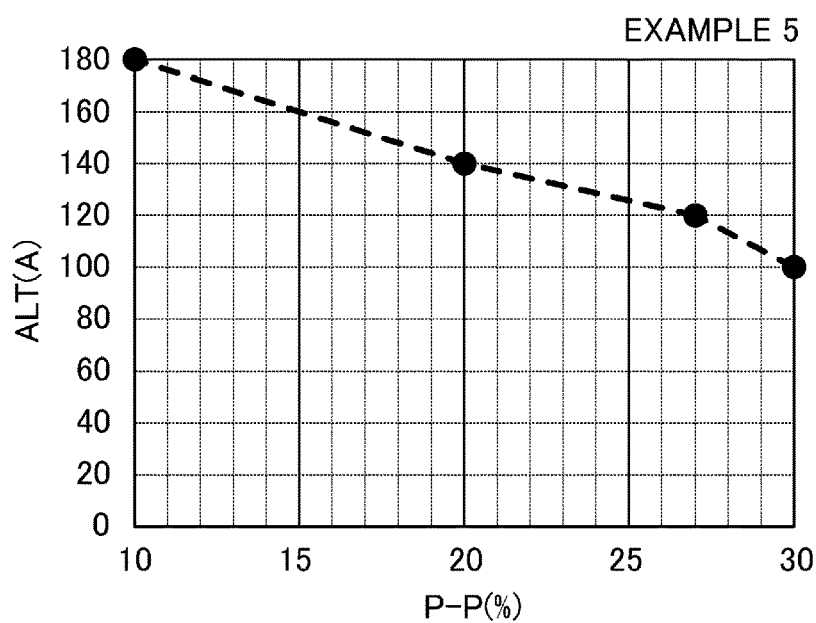
FIG. 9 shows results of an abnormal noise test carried out on a belt as a fifth specific example of the present disclosure.
Figure 10:
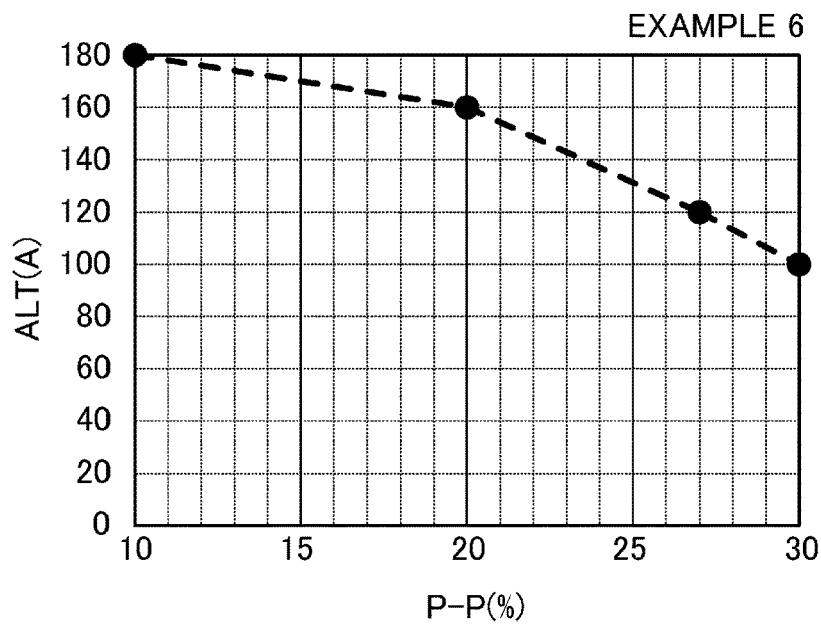
FIG. 10 shows results of an abnormal noise test carried out on a belt as a sixth specific example of the present disclosure.
Figure 11:
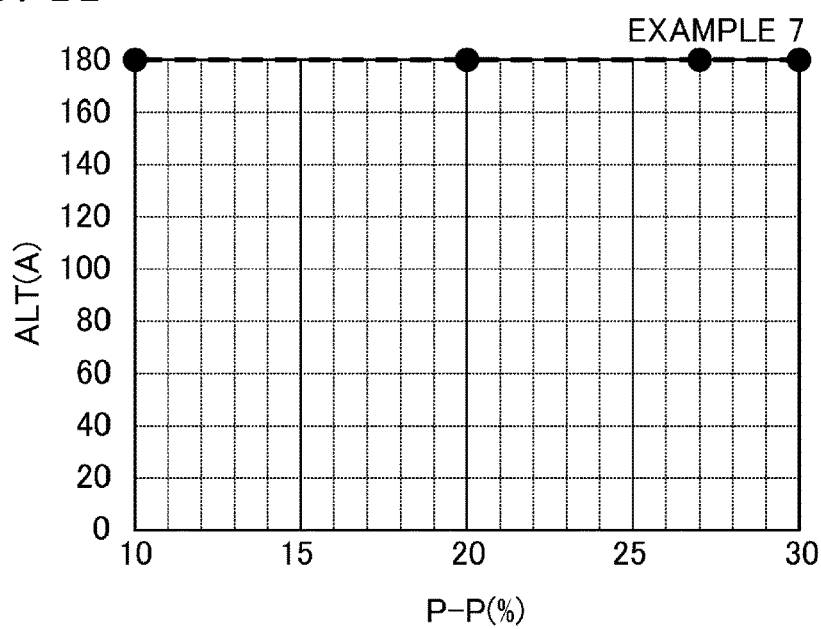
FIG. 11 shows results of an abnormal noise test carried out on a belt as a seventh specific example of the present disclosure.
Figure 12:
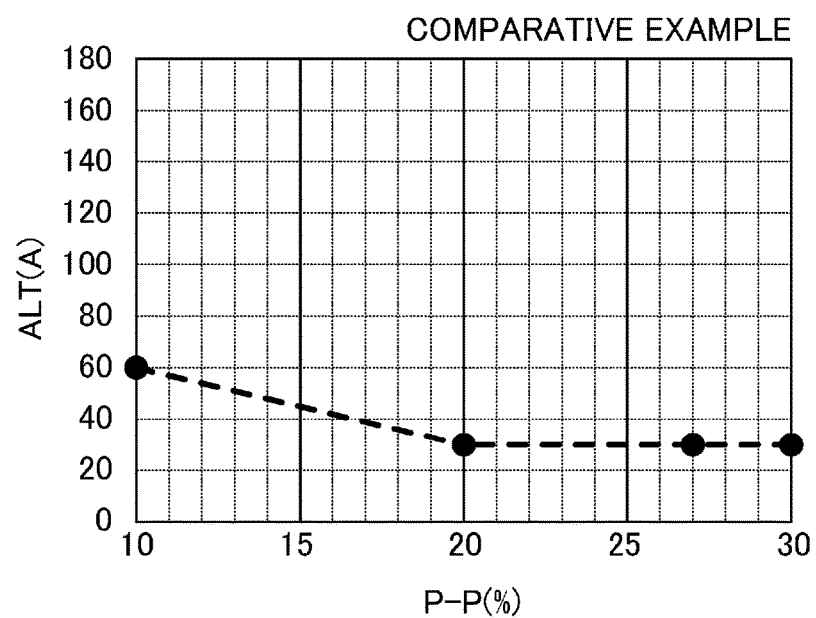
FIG. 12 shows results of an abnormal noise test carried out on a belt as a comparative example.

For example, in the fourth example shown in FIG. 8 (in which the knit fabric was made of an aramid spun yarn) and the seventh example shown in FIG. 11 (in which the knit fabric was made of a PET microfiber), the current had a threshold value of 180 A in the p-p value range of 10-30%. That is to say, no abnormal noise was generated at all in the range in which the test was carried out.

In the other examples, if the p-p value was 10%, the current had a threshold value of 180 A, and no abnormal noise was generated, either. As the p-p value increased, however, the current threshold value decreased, thus generating abnormal noise in some cases.

Figure 5:
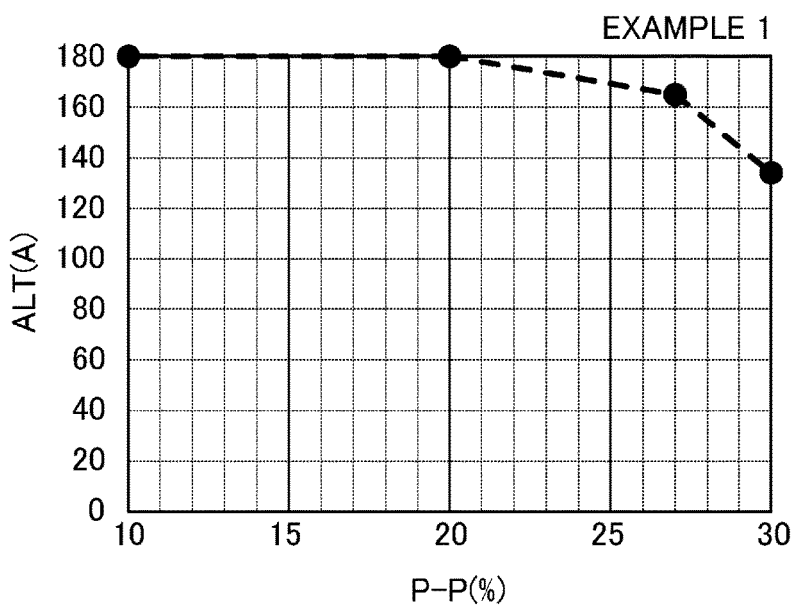
FIG. 5 shows results of an abnormal noise test carried out on a belt as a first specific example of the present disclosure.
Figure 6:
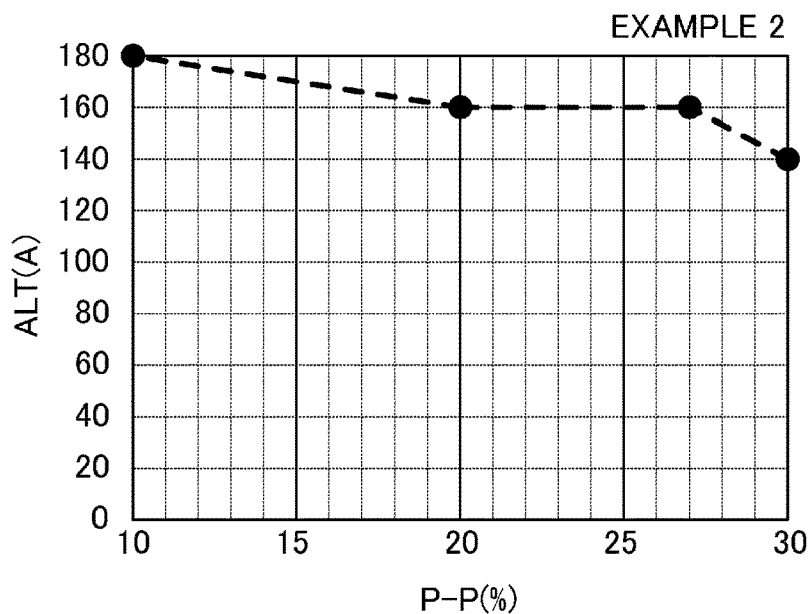
FIG. 6 shows results of an abnormal noise test carried out on a belt as a second specific example of the present disclosure.
Figure 7:
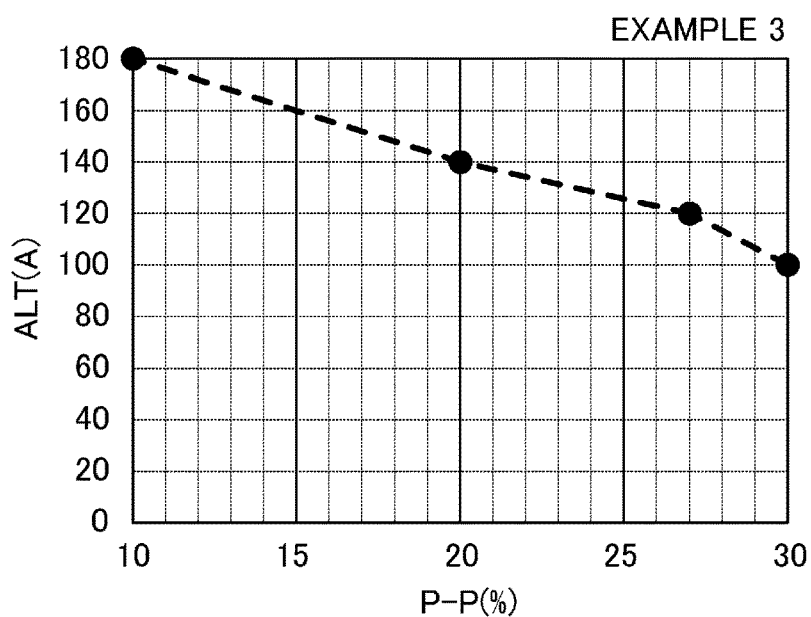
FIG. 7 shows results of an abnormal noise test carried out on a belt as a third specific example of the present disclosure.

Specifically, in the first example shown in FIG. 5 (in which the knit fabric was made of a PET spun yarn) and the second example shown in FIG. 6 (in which the knit fabric was made of a PET hollow yarn), as the p-p value increased from 10%, the current threshold value decreased. As a result, the current threshold value decreased to about 140 A when the p-p value was 30%. Meanwhile, in the third example (in which the knit fabric was made of a modified cross-section yarn), the fifth example (in which the knit fabric was made of an acrylate fiber), and the sixth example (in which the knit fabric was made of a microfiber), when the p-p value was 30%, the threshold value was 100 A, which was smaller than in any other example.

As described above, in the comparative example shown in FIG. 12, when the p-p value was 30%, the threshold value was about 30 A. Thus, in any of the first through seventh examples, the generation of abnormal noise could be reduced more significantly than in the comparative example. That is to say, covering one side of the belt that contacts with the pulley with a water absorptive fabric allows for reduction in the abnormal noise when the belt is exposed to the water poured.

Note that in each of the examples described above, a knit fabric was used as the fabric layer 16. However, the same or similar advantages would also be achieved even when a woven fabric is used instead of the knit fabric.

As can be seen from the foregoing description, a frictional transmission belt according to the present disclosure may maintain excellent power transmission capability even when exposed to water poured, and therefore, is useful particularly in an application in which the belt may be exposed to water.

What is claimed is:

1. A frictional transmission belt having a belt body wound around a pulley to transmit power, wherein
    the belt comprises a water absorptive fabric covering at least one side of the belt body that contacts with the pulley,
    the water absorptive fabric contains a water absorptive yarn selected from the group consisting of a spun yarn of polyethylene terephthalate, a spun yarn of polyamide, a spun yarn of aramid, or a combination thereof.
2. The frictional transmission belt of claim 1, wherein
    the water absorptive fabric is either a woven fabric or a knit fabric, and
    the water absorptive fabric is partially embedded in a rubber composition that makes up the belt body.
3. The frictional transmission belt of claim 1, wherein
    the yarn forming the water absorptive fabric includes a modified cross-section yarn.
4. The frictional transmission belt of claim 1, wherein
    the yarn forming the water absorptive fabric includes a microfiber.
5. The frictional transmission belt of claim 1, wherein
    the yarn forming the water absorptive fabric includes a hollow fiber.
6. The frictional transmission belt of claim 1, wherein
    the belt is produced by:
    winding a fabric around a surface of a rubber layer to form the belt body, thereby forming a molded part;
        pressing the molded part onto a belt-molding die having ribbed recesses that define the side to contact with the pulley; and
        allowing the molded body to crosslink.
7. The frictional transmission belt of claim 1, wherein
    the water absorptive yarn is a covering yarn including a core yarn and a covering fiber, and
    the spun yarn is used as the covering yarn.
8. The frictional transmission belt of claim 1, wherein
    the water absorptive fabric has been subjected to RFL treatment so that water absorptiveness by capillarity is maintained.

* * * * *